United States Patent
Shen et al.

(10) Patent No.: US 10,439,404 B2
(45) Date of Patent: Oct. 8, 2019

(54) HYBRID BATTERY PACK INCLUDING BI-DIRECTIONAL CHARGE REGULATOR

(71) Applicant: Microsoft Technology Licensing, LLC, Redmond, WA (US)

(72) Inventors: Wei Shen, Palo Alto, CA (US); Dongli Zeng, Fremont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 142 days.

(21) Appl. No.: 15/487,345

(22) Filed: Apr. 13, 2017

(65) Prior Publication Data

US 2018/0301912 A1    Oct. 18, 2018

(51) Int. Cl.
*H02J 7/00* (2006.01)
*H01M 10/44* (2006.01)
*H01M 10/42* (2006.01)

(52) U.S. Cl.
CPC ......... *H02J 7/0019* (2013.01); *H01M 10/441* (2013.01); *H02J 7/0018* (2013.01); *H02J 7/0021* (2013.01); *H02J 7/0081* (2013.01); *H01M 2010/4271* (2013.01)

(58) Field of Classification Search
CPC .................................................... H02J 7/0019
USPC ......................................................... 320/112
See application file for complete search history.

(56) References Cited

U.S. PATENT DOCUMENTS

| | | | |
|---|---|---|---|
| 7,880,434 B2 | 2/2011 | White et al. | |
| 9,136,715 B2 | 9/2015 | Wu | |
| 2009/0325056 A1 | 12/2009 | Greening et al. | |
| 2010/0019724 A1 | 1/2010 | Mizutani et al. | |
| 2010/0045248 A1 | 2/2010 | Hawley | |
| 2013/0058141 A1 | 3/2013 | Oraw et al. | |
| 2013/0221926 A1 | 8/2013 | Furtner | |
| 2014/0145669 A1* | 5/2014 | Wortham | H01M 10/4207 320/103 |
| 2015/0207339 A1 | 7/2015 | Hamburgen et al. | |
| 2015/0207345 A1* | 7/2015 | Greening | H02J 7/0016 320/118 |
| 2016/0020621 A1 | 1/2016 | Baby et al. | |

OTHER PUBLICATIONS

"International Search Report and Written Opinion Issued in PCT Application No. PCT/US2018/026152", dated Jul. 20, 2018, 12 Pages.

Cleveland, Terry L., "Bi-directional Power System for Laptop Computers", In Proceedings of Applied Power Electronics Conference and Exposition, Mar. 6, 2005, 5 pages.

\* cited by examiner

*Primary Examiner* — Edward Tso
*Assistant Examiner* — Ahmed H Omar
(74) *Attorney, Agent, or Firm* — Alleman Hall Creasman & Tuttle LLP

(57) ABSTRACT

A system for a rechargeable battery pack includes one or more lower voltage cells connectable to a charging circuit via a lower voltage terminal and one or more higher voltage cells electrically coupled in series to the one or more lower voltage cells via a bi-directional charge regulator. A higher voltage terminal is electrically coupled to the one or more higher voltage cells, and a common ground terminal is coupled to the one or more lower voltage cells and to the one or more higher voltage cells.

20 Claims, 8 Drawing Sheets

HYBRID BATTERY PACK INCLUDING BI-DIRECTIONAL CHARGE REGULATOR

BACKGROUND

Portable electronic devices may utilize rechargeable battery packs for mobile energy storage. The configuration and voltage characteristics of a battery pack influence the overall efficiency of the electronic device, which in turn impacts the battery run time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In one disclosed example, a system for a rechargeable battery pack includes one or more lower voltage cells connectable to a charging circuit via a lower voltage terminal and one or more higher voltage cells electrically coupled in series to the one or more lower voltage cells via a bi-directional charge regulator. A higher voltage terminal is electrically coupled to the one or more higher voltage cells, and a common ground terminal is coupled to the one or more lower voltage cells and to the one or more higher voltage cells.

DETAILED DESCRIPTION

Figure 1:
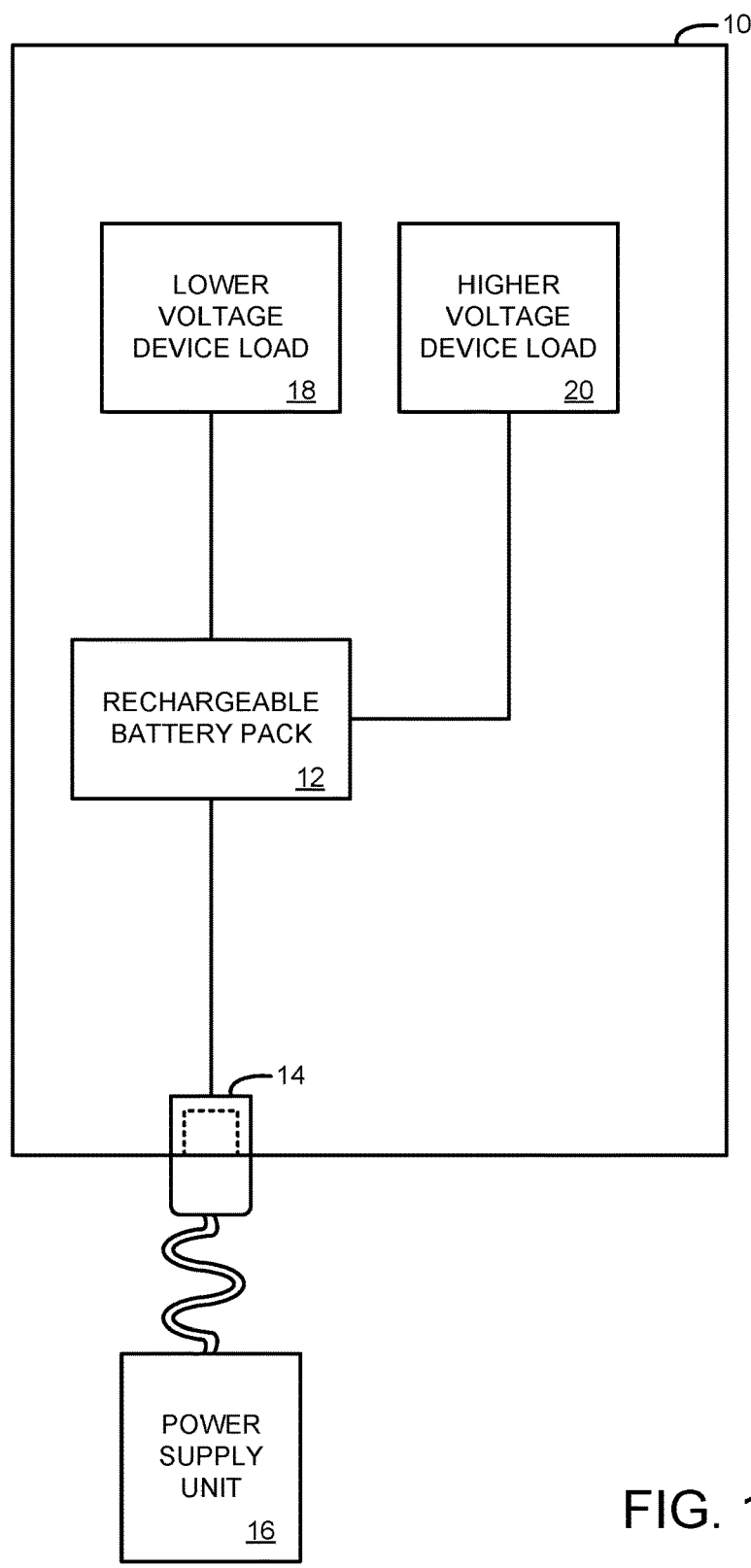
FIG. 1 schematically shows an electronic device including a rechargeable battery pack.

Rechargeable lithium-ion (Li-ion) batteries have inherent advantages in their relatively high energy density, long cycle life, and relatively high operational voltage. These features make lithium-ion batteries a preferred choice for energy storage in portable electronic devices. As portable electronic devices incorporate additional features and functions, the demands on the device battery pack increase. Portable electronic devices may rely on battery packs to provide low voltage power for certain device loads and high voltage power for other device loads.

Many smart phones and tablet computing systems use a one-cell-voltage pack configuration (e.g., all battery cells in parallel). This setup is applicable for these systems as most of the digital chips used in these devices are operated in a low voltage range (e.g., sub-1-volt). If higher voltage is needed, (e.g., 3.3V, 5V, or higher voltage rails), Buck-Boost and/or Boost regulators may be added to the battery circuit. However, as the current drawn from a parallel-configured pack is relatively high, large internal resistance (DCR) drops are common, which could potentially result in system brownouts. Even though the overall power demand is low, there can be many demand peaks, and such systems may exhibit a loss of peak current.

Alternately, laptop computers, featuring relatively high power consumption requirements, typically adopt battery configurations with 3 or 4 Li-ion cells in series. In this type of configuration, the amount of current drawn from the battery is relatively low due to the high battery pack voltage. As such, DCR losses are reduced. To deliver low voltage power, Buck regulators (and/or Buck-Boost regulators) may be added to the battery circuit. However, regulators that run at low duty cycles to supply power to sub-1-volt processors and memory chips have relatively low efficiency, resulting in higher charge losses and additional heat generation. Further, for symmetric, series battery configurations, the two portions of the battery pack are likely to have asymmetric demands and thus become imbalanced over time when the electronic device is in use. To charge the device, such an imbalance must be accounted for, less multiple charge ports are implemented. This requires an active balancing system to achieve stable current and voltage on both higher and lower voltage portions of the battery pack, which inherently wastes stored charge.

Accordingly, an asymmetrically configured, rechargeable hybrid battery pack is described herein that provides both lower voltage (LV) and higher voltage (HV) outputs. One example battery pack includes a first set of n cells in parallel configured to provide lower voltage (LV), and a second set of k ($1 \le k \le n$) cells, in series with the first set of cells to provide higher voltage (HV). The HV output and LV output share the same return, and are selectively coupled via a bi-directional charge regulator to charge/discharge the second set of cells. Such a battery configuration may increase total system efficiency, yielding longer device operation time when compared with equivalent one-cell-voltage pack configurations. Such a self-contained battery pack may involve no additional system hardware or software changes, may be charged by any conventional charger, may enable real-time state-of-charge (SOC) reporting of the whole battery pack, and may provide self-protection from over-current and over-voltage scenarios.

FIG. 1 schematically shows an example electronic device 10 that includes a rechargeable battery pack 12. Electronic device 10 may take any suitable form, including, but not limited to, a tablet computer, a smart phone, a laptop computer, a virtual reality device, and a wearable computing device. In general, the disclosed charging topology is compatible with virtually any electronic device that utilizes a rechargeable battery.

As schematically shown in FIG. 1, electronic device 10 includes a charging interface 14 that is configured to receive power from a power supply unit 16. In some implementations, charging interface 14 allows the electronic device 10 to be selectively connected and disconnected from the power supply unit 16. When connected, the power supply unit can power the electronic device and/or charge the battery pack 12. When disconnected, the electronic device draws power from the battery pack 12 and can be used as a mobile device that need not be tethered to a stationary power source.

Non-limiting examples of charging interface 14 include the various Universal Serial Bus connector receptacles or plugs (e.g., Type A, Type B, Type C, Micro-A, Micro-B, Mini-A, Mini-B, charging downstream port, dedicated charging port). Other detachable interfaces are also envisaged, and charging interface 14 is in no way limited to Universal Serial Bus receptacles or plugs. In some implementations, the charging interface 14 may include an inductive coupling configured to wirelessly receive power. In some implementations, the electronic device may include a dedicated power supply unit and the power interface may be hard-wired. In general, any interface that allows a transfer of electrical power may be used.

The power supply unit 16 may be configured to supply a direct current (DC) voltage. In some examples, the power supply unit 16 may include an alternating current (AC) to DC converter. In some examples, the power supply unit may include one or more solar cells configured to convert light energy into DC power and/or a fuel cell configured to convert chemical energy into DC power.

Lower voltage device load 18 and higher voltage device load 20 may each include one or more power consuming components. In general, a device load may include any component that draws electrical power. In this example, lower voltage device load 18 may draw less electrical power than does higher voltage device load 20. The set of power consuming components may vary depending on the type of electronic device. For example, lower voltage device load 18 may include processors, integrated circuits, memory, electronic displays, 1.8V I/O's, etc. Higher voltage device load 20 may include large current blocks and 3.3V/5V rails, which may be coupled to other power consuming components. Such components may be located internal to electronic device 10 or may be located external to electronic device 10 and electrically coupled to rechargeable battery pack 12. As such, rechargeable battery pack 12 may be configured to provide both low voltage (e.g., 1V, ~3.7V) for lower voltage device loads and high voltage (e.g., 5V, ~7.4V) for higher voltage device loads as needed.

Figure 2:
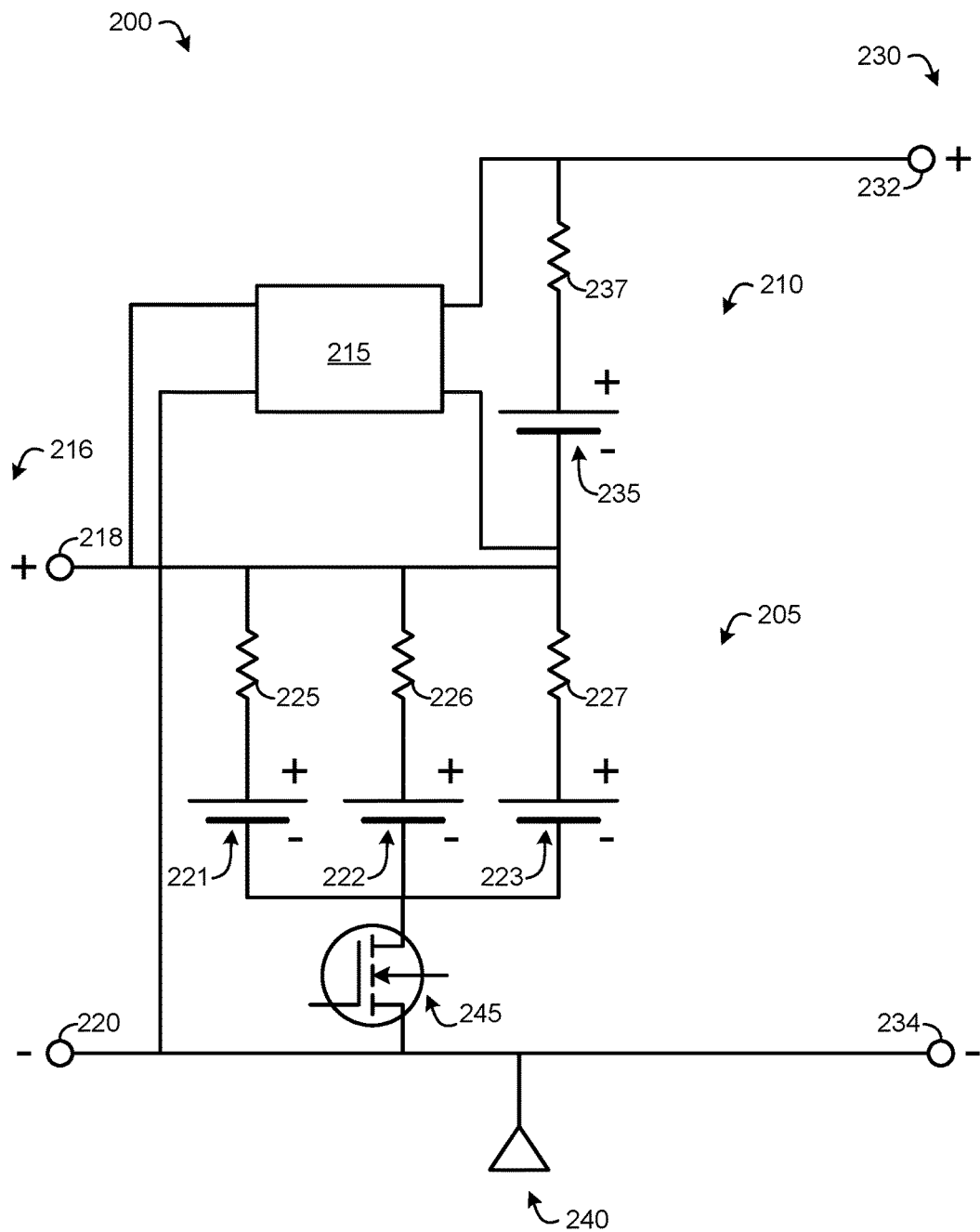
FIG. 2 schematically shows an example asymmetrical hybrid battery pack.

FIG. 2 schematically shows an example asymmetrical hybrid battery pack system 200. Battery pack system 200 includes a lower voltage portion 205 and a higher voltage portion 210. Lower voltage portion 205 and higher voltage portion 210 are electrically coupled in series via bi-directional charge regulator 215.

Lower voltage side 205 includes a lower voltage output 216. Lower voltage output 216 includes lower voltage positive terminal 218 (LV+) and lower voltage negative terminal 220 (LV−). Lower voltage output 216 may be selectively connectable to a charging circuit, e.g., power supply unit 16 as shown in FIG. 1. For example, lower voltage output 216 may be coupled to any suitable low voltage charger, such as a USB charger and/or any other 5V charging device, depending on the configuration of the corresponding charging interface. Such charging circuits may be operable to charge battery pack system 200 via lower voltage output 216 without adjusting the topology, charge current setting, and/or charge termination mechanism of the charging circuit.

Lower voltage portion 205 includes three lower voltage cells: lower voltage cell 221, lower voltage cell 222, and lower voltage cell 223, though more or fewer lower voltage cells may be included in other examples. Lower voltage cells 221, 222, and 223 are connected in parallel. Each lower voltage cell is depicted as being coupled to LV+ 218 via a resistor (that also may be a symbolic representation of other components as well, such as conductors, connectors, fuses, etc.), e.g., lower voltage cell 221 is coupled to LV+ 218 via resistor 225, lower voltage cell 222 is coupled to LV+ 218 via resistor 226, and lower voltage cell 223 is coupled to LV+ 218 via resistor 227. As mentioned above, although depicted as single resistors, resistors 225, 226, and 227 may also be a symbolic representation of a plurality of components, and may represent conductors, connectors, fuses, and other components not explicitly shown.

Higher voltage portion 210 includes a higher voltage output 230. Higher voltage output 230 includes higher voltage positive terminal 232 (HV+) and higher voltage negative terminal 234 (HV−). Higher voltage portion 210 includes higher voltage cell 235, though more higher voltage cells may be included in some examples. Higher voltage cell 235 is depicted as being coupled to HV+ 232 via resistor 237. Although depicted as a single resistor, resistor 237 may also represent other components such as conductors, connectors, fuses, etc. Both lower voltage portion 205 and higher voltage portion 210 are coupled to common ground 240. Lower voltage cells 221, 222, and 223 and higher voltage cell 235 may be any suitable rechargeable battery cell, such as lithium-ion cells, though higher voltage cell 235 may have capacities and other properties that differ from lower voltage cells 221, 222, and 223.

A breaker transistor 245 is shown coupled between lower voltage portion 205 and common ground 240. Breaker transistor 245 may include one or more metal-oxide field-effect transistors (MOSFETs). For example, breaker transistor 245 may include back-to-back connected n-channel MOSFETs (nMOS), however any suitable switching gate (or gates) may be used. Breaker transistor 245 may be selectively operable to electrically de-couple the negative terminals of lower voltage portion 205 and higher voltage portion 230 from common ground 240. Breaker transistor 245 may thus serve as a cutoff between battery cells 221, 222, 223, and 235 and system outputs 216 and 230.

Charge from lower voltage output 216 and higher voltage output 230 returns to the battery cells via breaker transistor 245 when breaker transistor 245 is turned on. Thus, by turning breaker transistor 245 off, charge return is limited, and battery system 200 is protected from over-current faults and/or over-voltage faults. In some examples, an ideal diode or transistor may be placed at LV+ 218. Such a diode or transistor may restrict current flow back into the terminal, preventing the generation of a conduction path between HV+ 232 and LV+ 218, and thereby protecting higher voltage cell 235.

Figure 3:
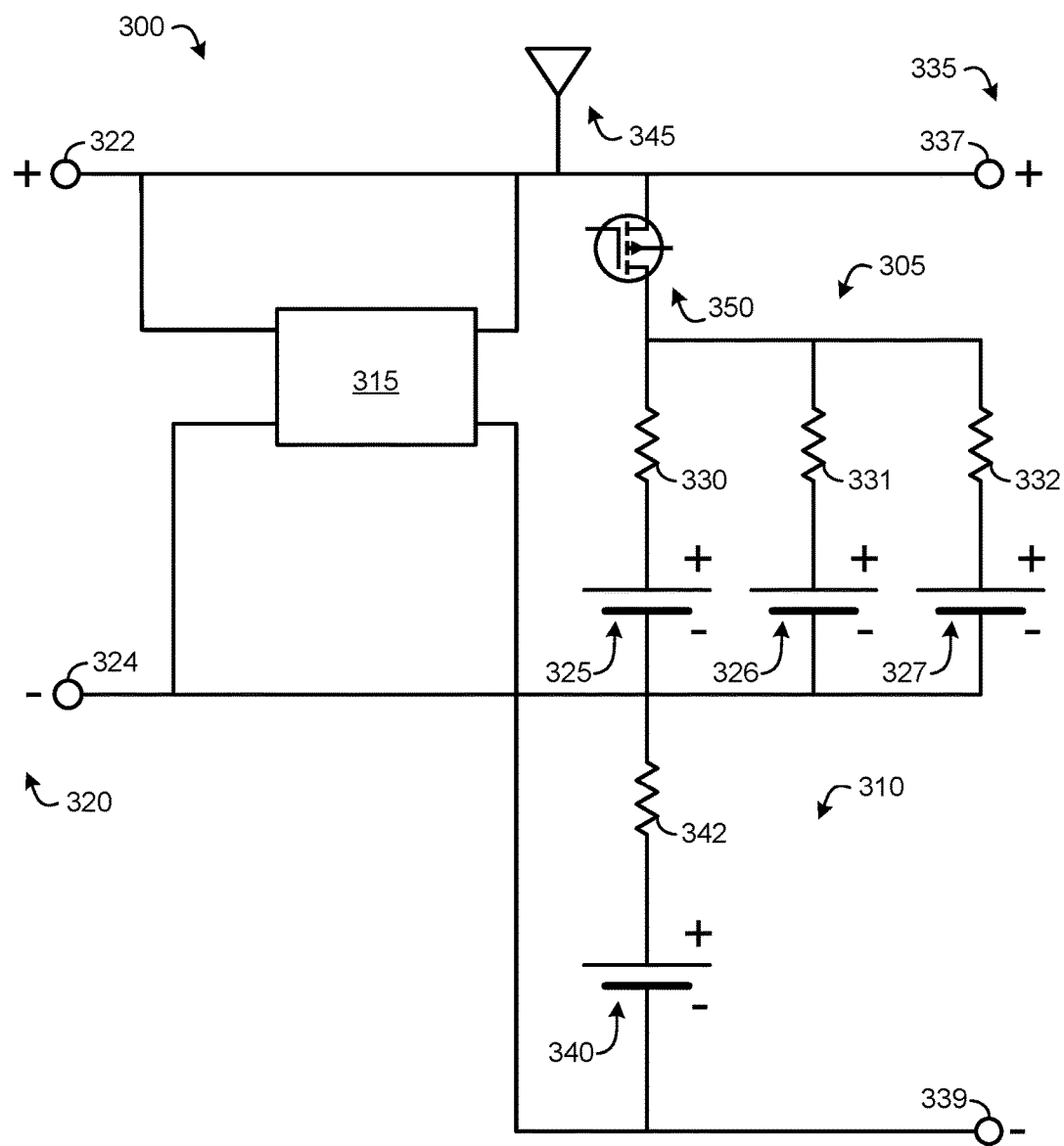
FIG. 3 schematically shows an additional example asymmetrical hybrid battery pack.

An alternate configuration for an asymmetrical hybrid battery pack system is shown in FIG. 3. FIG. 3 schematically shows an example asymmetrical hybrid battery pack system 300. Battery pack system 300 includes a lower voltage portion 305 and a higher voltage portion 310. Lower voltage portion 305 and higher voltage portion 310 are electrically coupled in series via bi-directional charge regulator 315.

Lower voltage portion 305 includes a lower voltage output 320. Lower voltage output 320 includes lower voltage positive terminal 322 (LV+) and lower voltage negative terminal 324 (LV−). Lower voltage output 320 may be selectively connectable to a charging circuit, e.g., power supply unit 16, as shown in FIG. 1. Lower voltage portion 305 includes three lower voltage cells: 325, 326, and 327, though more or fewer voltage cells may be included in other examples. Lower voltage cells 325, 326, and 327 are connected in parallel. Each voltage cell is coupled to LV+ 322 via a resistor, e.g., lower voltage cell 225 is coupled to LV+ 322 via resistor 330, lower voltage cell 226 is coupled to LV+ 322 via resistor 331, and lower voltage cell 327 is coupled to LV+ 322 via resistor 332. As per FIG. 2, resistors 330, 331, and 332 may also represent one or more conductors, connectors, fuses, etc.

Higher voltage portion 310 includes a higher voltage output 335. Higher voltage output 335 includes higher voltage positive terminal 337 (HV+) and higher voltage negative terminal 339 (HV−). Higher voltage portion 310 includes higher voltage cell 340, though more higher voltage cells may be included in some examples. Higher voltage cell 340 is shown coupled to HV+ 337 via resistor 342, though in some examples, higher voltage cell 340 may be coupled to HV+ 337 via a plurality of conductors, connectors, fuses, etc. Both lower voltage portion 305 and higher voltage portion 310 are coupled to common ground 345. A breaker transistor 350 is shown coupled between lower voltage portion 305 and common ground 345.

Both rechargeable battery pack systems 200 and 300 include asymmetric configurations where the quantity of lower voltage cells (3) is greater than the quantity of higher voltage cells (1). For electronic devices such as smart phones, tablet computers, wearable devices, etc., the demand for lower voltage power may be greater than the demand for higher voltage power, and thus the battery pack systems for such devices may include a greater number of lower voltage cells than higher voltage cells. In general, battery pack systems of the current disclosure may comprise n lower voltage cells and k higher voltage cells, where 1≤k≤n, and wherein the n lower voltage cells are coupled in parallel, and the k higher voltage cells are coupled in series with the n lower voltage cells.

Even in scenarios where k=n, the higher voltage and lower voltage portions of the battery pack may have differing properties, and thus considered to be in an asymmetric configuration. For example, the higher and lower voltage cells may have differing capacities, manufacturing processes, chemistry types, etc. As such, the bi-directional charge regulators and control mechanisms described herein may also apply to such battery pack configurations.

Bi-directional charge regulators 215 and 315 may be configured to allow intra-battery pack handling of the charging and discharging needs of the battery pack by acting as a Boost regulator in one direction and as a Buck regulator in the other direction. For example, bi-directional charge regulator 215 may be configured to provide current to higher voltage portion 210 responsive to lower voltage output 216 being connected to a charging circuit. Further, bi-directional charge regulator 215 may enable the discharging of higher voltage cell 235 to lower voltage cells 221, 222, and 223 when additional lower voltage power is needed, such as when lower voltage cells 221, 222, and 223 are depleted faster than is higher voltage cell 235. Additionally, bi-directional charge regulator 215 may enable the discharging of lower voltage cells 221, 222, and 223 to higher voltage cell 325 when additional higher voltage power is needed. Such discharging may extend device usage time, providing a short-term charge distribution solution prior to necessitating coupling the device to an external charging circuit.

During charging, the bi-directional charge regulators may monitor the voltage of both higher and lower voltage cells and regulate charge distribution accordingly in order to keep the two portions of the battery pack balanced. For example, responsive to the one or more lower voltage cells being connected to the charging circuit, the bi-directional charge regulator may monitor voltages of the one or more lower voltage cells and one or more higher voltage cells and regulate charge flow to the one or more higher voltage cells such that a state of charge increase of the one or more lower voltage cells is within a controlled error margin of a state of charge increase of the one or more higher voltage cells.

During device operation, the higher and lower voltage cells may be exposed to different load usage, and the bi-directional charge regulator may thus charge either direction to balance the charge between LV and HV cells. For example, the bi-directional charge regulator may be configured to provide current to the one or more lower voltage cells from the one or more higher voltage cells responsive to a state of charge of the one or more lower voltage cells decreasing below a state of charge of the one or more higher voltage cells by a threshold. Additionally, the bi-directional charge regulator may be further configured to cease providing current to the one or more lower voltage cells from the one or more higher voltage cells responsive to a state of charge of the one or more lower voltage cells increasing to within a threshold of the state of charge of the one or more higher voltage cells.

The differing voltage demands of the parent electronic device may drain the higher voltage cells and lower voltage cells at different rates, even when the bi-directional charge regulator is actively balancing charge within the battery pack. Thus, to determine and indicate an overall state of charge (SOC) of an asymmetric battery pack, both higher voltage and lower voltage portions can be accounted for. For example, both higher voltage and lower voltage cell voltages may be constantly monitored, and thus the overall SOC of the battery pack may be determined at any time based on real-time cell voltages. The overall SOC may then be indicated to a user as a percentage of overall charge, for example, by indicating a state of charge percentage as an icon on a display device. As one example, the following equation may be utilized to determine an overall SOC:

$$SOC_{pack} = \frac{k * SOC_{HV}(HV - LV) + n * SOC_{LV}(LV)}{k + n},$$

wherein k is the number of higher voltage cells and n is the number of lower voltage cells. Using the example of FIG. 2, LV is the voltage across lower voltage output 216 and HV is the voltage across higher voltage output 230.

Compared to traditional battery pack configurations where all battery cells are in parallel, the asymmetric, hybrid battery pack structure may incur additional energy losses due to the internal charging and balancing process performed by the bi-direction charge regulator. However, overall efficiency may be increased by directly supplying high pulsing power blocks and 3.3V/5V rails off higher voltage cells via Buck regulators, which may have higher efficiency and wider band-width than Buck-Boost and Boost counterparts.

Figure 4:
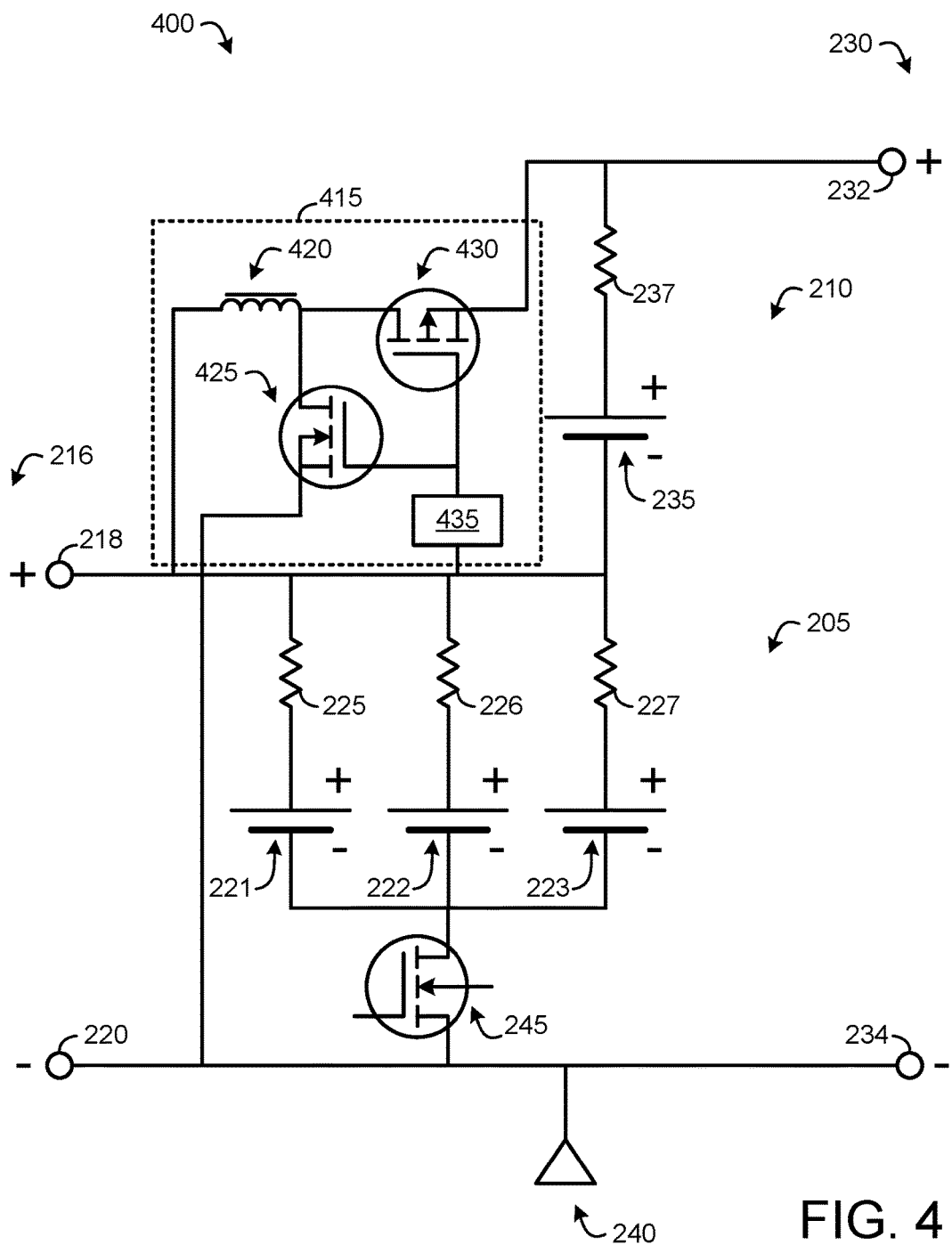
FIG. 4 schematically shows an example hybrid battery pack including a bi-directional charge regulator.

FIG. 4 schematically shows an example rechargeable battery pack system 400. Battery pack system 400 includes lower voltage portion 205, higher voltage portion 210, as well as other components previously described with regard to FIG. 2. Lower voltage portion 205 and higher voltage portion 210 are electrically coupled in series via bi-directional charge regulator 415. Bi-directional charge regulator 415 may be powered via higher voltage output 230.

Bi-directional charge regulator 415 includes inductor 420. Inductor 420 may be selectively coupled to lower voltage portion 205 via first transistor 425. Further, inductor 420 may be selectively coupled to higher voltage portion 210 via second transistor 430. Bi-directional charge regulator 415 further includes control circuit 435. Control circuit 435 may receive signals from various sensors throughout battery pack system 400, and may output control signals to first transistor 425 and second transistor 430 based on the received signals. For example, control circuit 435 may provide pulse-width modulation control signals to first transistor 425 and second transistor 430. Control circuit 435 may thus be operable to control current flowing out of bi-directional charge regulator 415, both into lower voltage portion 205 and into higher voltage portion 210.

Control circuit 435 may operate when the battery pack and/or the parent electronic device is in an "awake" mode, and when operation is enabled via any governing control systems. For example, control circuit 435 may receive control signals from a system controller of the electronic device, indicating a mode of operation to control circuit 435. For example, the control circuit may be placed in an off mode, a charging (Boost) mode, a discharging (Buck) mode, and/or other suitable modes.

First transistor 425 and second transistor 430 may be default-off transistors, actuatable to an on conformation based on a signal received from control circuit 435. When control circuit 435 is placed in an "off" mode, both first transistor 425 and second transistor 430 may be maintained in an off conformation. In this configuration, no current may flow through either transistor, and no current may flow out of bi-directional charge regulator 415.

During a charging scenario, where a charging circuit is coupled to lower voltage output 216, and where HV cell 235 needs to be charged as well as LV cells 221, 222, and 223, bi-directional charge regulator 415 may operate akin to a Buck-Boost regulator in a boost mode. Controller 435 may operate to switch the conformations of first transistor 425 and second transistor 430 at each clock moment to enable regulated current flow to HV cell 235. Initially, first transistor 425 may be turned on, allowing current from the charging circuit to build up at inductor 420. When current at inductor 420 reaches a threshold, first transistor 425 may be turned off, while second transistor 430 is turned on. In this conformation, the LV portion of inductor 420 (left-hand portion in FIG. 4) has a higher voltage than does the HV portion (right-hand portion). As such, current ramps down from inductor 420 to higher voltage cell 235. This switching pattern continues, inverting which of first transistor 425 and second transistor 430 is so that charge current is temporarily stored at inductor 420 before being released to higher voltage portion 210.

During a discharging scenario, where HV cell 235 holds more voltage than do LV cells 221, 222, and 223, bi-directional regulator may operate as a true Buck regulator. Initially, second transistor 430 may be turned on, allowing current output by HV cell 235 to build up at inductor 420. When current at inductor 420 reaches a threshold, second transistor 430 may be turned off, while first transistor 425 is turned on. In this conformation, the HV side of inductor 420 (right-hand side in FIG. 4) has a higher voltage than does the LV side (left-hand side). As such, current ramps down from inductor 420 to lower voltage cells 221, 222, and 223. This pattern continues, inverting which of first transistor 425 and second transistor 430 is so that charge current is temporarily stored at inductor 420 before being released to lower voltage portion 205.

Figure 5:
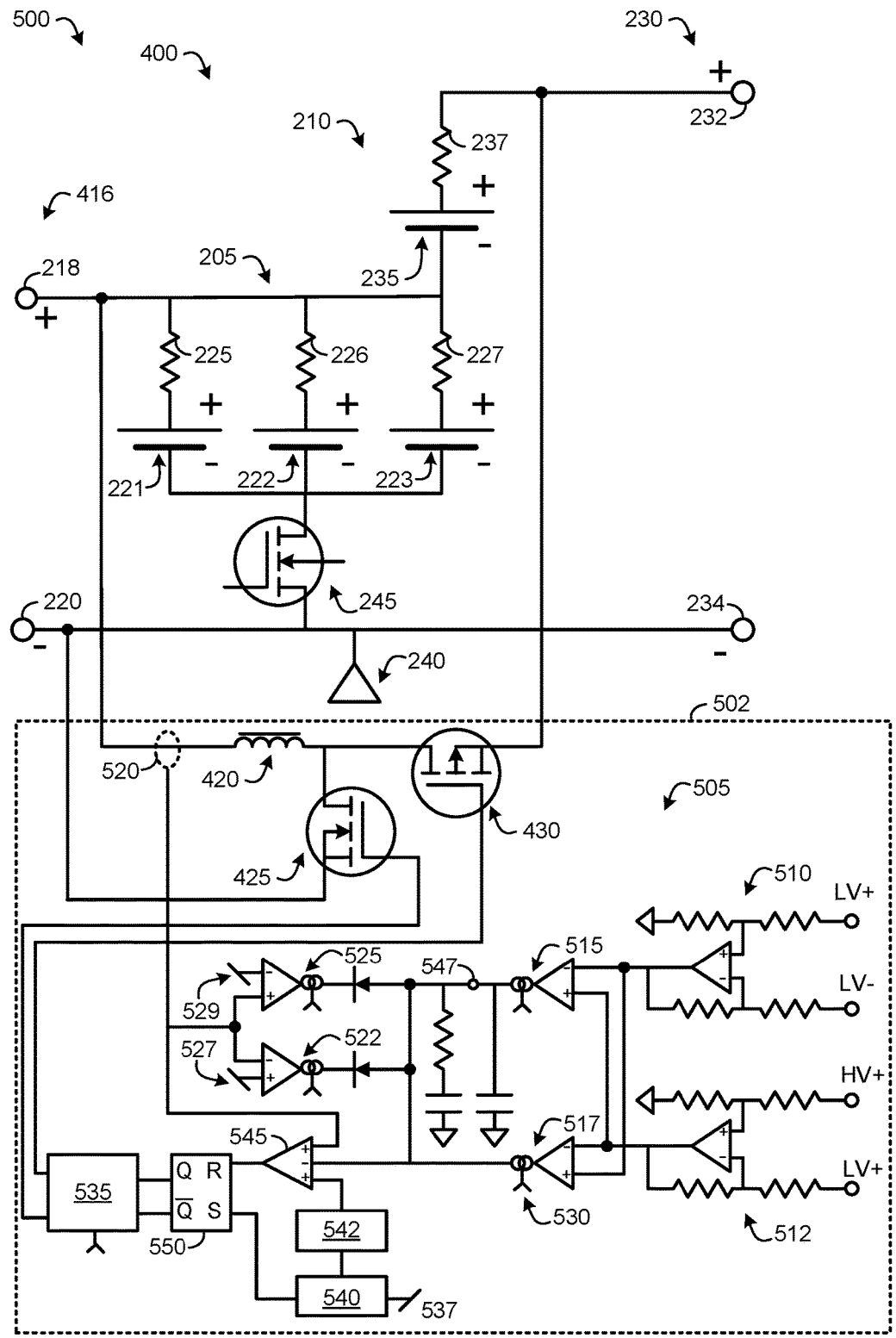
FIG. 5 schematically shows a control circuit for an example hybrid battery pack including a bi-directional charge regulator.

FIG. 5 schematically shows an example rechargeable battery pack control system 500. Battery pack control system 500 includes battery pack system 400 including components described herein and with regard to FIGS. 2 and 4. Battery pack control system 500 includes bi-directional charge regulator 502, which includes control circuit 505. Control circuit 505 may be an example of control circuit 435.

Control circuit 505 may receive input signals from first voltage readout 510 and from second voltage readout 512. First voltage readout 510 may provide a signal that is proportionate to the state of charge of lower voltage portion 205. First voltage readout 510 may monitor the voltage differential across lower voltage positive terminal 218 and lower voltage negative terminal 220.

Second voltage readout 512 may provide a signal that is proportionate to the difference in state of charge of higher voltage portion 230 as compared to lower voltage portion 205. Second voltage readout 512 may monitor the voltage differential across lower voltage positive terminal 218 and higher voltage positive terminal 232. The signals received from first voltage readout 510 and second voltage readout 512 may be provided to first voltage amplifier 515 and second voltage amplifier 517, respectively. In tandem, the signals received from first voltage readout 510 and second voltage readout 512 enable controlled balancing of the cell voltages of lower voltage portion 205 and higher voltage portion 210.

A bi-directional inductor current sensor 520 may generate a signal that is proportionate to signal going into or coming out of inductor 420. The signal from bi-directional inductor current sensor 520 may be provided to first current amplifier 522 and second current amplifier 525. First current amplifier 522 may also receive an input proportionate to an input current limit 527 for the inductor, while second current amplifier 525 may also receive an input proportionate to an output current limit 529 for the inductor. These signals allow for control of current entering inductor 420 and for control of current exiting inductor 420, in either direction.

A mode control signal 530 may indicate which of amplifiers 515, 517, 522, and 525 are active (for simplicity, mode control signal 530 is depicted only for amplifier 517), and thus may determine whether control circuit 505 is operating in a charging or discharging mode. Mode control signal 530 may also be provided to gate signal generator 535, thus determining whether control circuit 505 is active or inactive.

A run signal 537 may be fed into a clock circuit 540, indicating when clock circuit 540 should output a clocking signal. The clock signal may be output to slope generator 542, which may then provide a periodically decaying signal to multi-input comparator 545. Comparator 545 may also receive a signal from bi-directional inductor current sensor 520 as well as a signal proportionate to an overall battery state of charge such as the voltage signal ($V_C$) at 547.

Clock circuit 540 and comparator 545 may provide signals to flip-flop 550, which may in turn provide signals to gate signal generator 535. Gate signal generator 535 may then provide signals to first transistor 425 and second transistor 430, indicating when the transistors should be turned on and off, and thus determining whether charge should be built up at or discharged from inductor 420, and in what direction.

In a steady-state condition, where first transistor 425 and second transistor 430 are alternately switched on and off, current and voltage at inductor 420 peak and valley over time. Both inductor current and inductor voltage can be regulated by adjusting pulse-width modulation. The pulse-width may be determined based on signals output by voltage amplifiers 515 and 517 (e.g., lower voltage portion voltage and high/lower voltage differential). The signals output by voltage amplifiers 515 and 517 may also determine whether gate signal generator 535 is active (e.g., via mode control signal 530), and which direction current is flowing into and out of inductor 420.

During charging, an external charger provides current to LV terminals 218 and 220. Mode control signal 530 may indicate to turn off current amplifiers 522 and 525. Voltage amplifier 515 may also be disabled while a charging circuit is coupled to lower voltage terminals 218 and 220. Once current from the external charger begins to flow into the battery pack system 400, voltage amplifier 517 may effectively force the voltage of higher voltage portion 230 to track with the voltage of lower voltage portion 205. The total input charging current is allocated between lower voltage portion 205 and higher voltage portion 210 in real time by the switching on and off of transistors 425 and 430. In this way, bi-directional regulator 502 works as a peak-current, mode-control Boost regulator. As such, when the voltages of lower voltage cells 221, 222, and 223 reach a threshold level, thus terminating charging by the external charger, higher voltage cell 235 is also charged to the same level. A timeline for charging operations in this manner is described with regard to FIG. 6.

Another operating scenario occurs when the voltage of lower voltage portion 216 is higher than the voltage of higher voltage portion 230. In this scenario, bi-directional charge regulator 502 also works as a peak-current, mode-control Boost regulator. Mode control signal 530 may enable voltage amplifier 517 and current amplifier 522 and disable voltage amplifier 515 and current amplifier 525. In this way, stored charge in lower voltage cells 221, 222, and 223 can be transferred to higher voltage cell 235, and the current output of the lower voltage cells will be limited by the pre-set value of input current limit 527. The process is terminated when the voltages of lower voltage portion 216 and higher voltage portion 230 equilibrate, or by a mode control command signal.

During discharging, bi-directional charge regulator 502 works as an active balancer, and the direction of current flow is determined by voltages of lower voltage portion 216 and higher voltage portion 230. When the voltage of higher voltage cell 535 is greater than the voltages of lower voltage cells 221, 222, and 223, bi-directional charge regulator 502 operates as peak-current, mode-control Buck regulator. Mode control signal 530 enables voltage amplifier 515 and current amplifier 525 and disables voltage amplifier 517 and current amplifier 522. In this way, stored charge in higher voltage cell 235 is transferred to lower voltage cells 221, 222, and 223, and the current input to lower voltage cells 221, 222, and 223 is limited by the pre-set value of output current limit 529. The process is terminated when the voltages of lower voltage portion 216 and higher voltage portion 230 equilibrate, or by a mode control command signal. A timeline for discharging operations in this manner is described with regard to FIG. 7.

To reduce the energy losses and number of charging cycles that may result from actively balancing lower voltage portion 205 and higher voltage portion 210, a relatively large voltage hysteresis can be set between the two voltages. Such settings can be overridden by system software, for example, if one portion is close to a shut-down level of voltage remaining, and charge balancing is needed to keep the device powered for an additional duration. However, if the load partition between lower voltage output 216 and higher voltage output 230 mirrors the state of charge distribution, charge balancing may not be performed between recharging operations.

Figure 6:
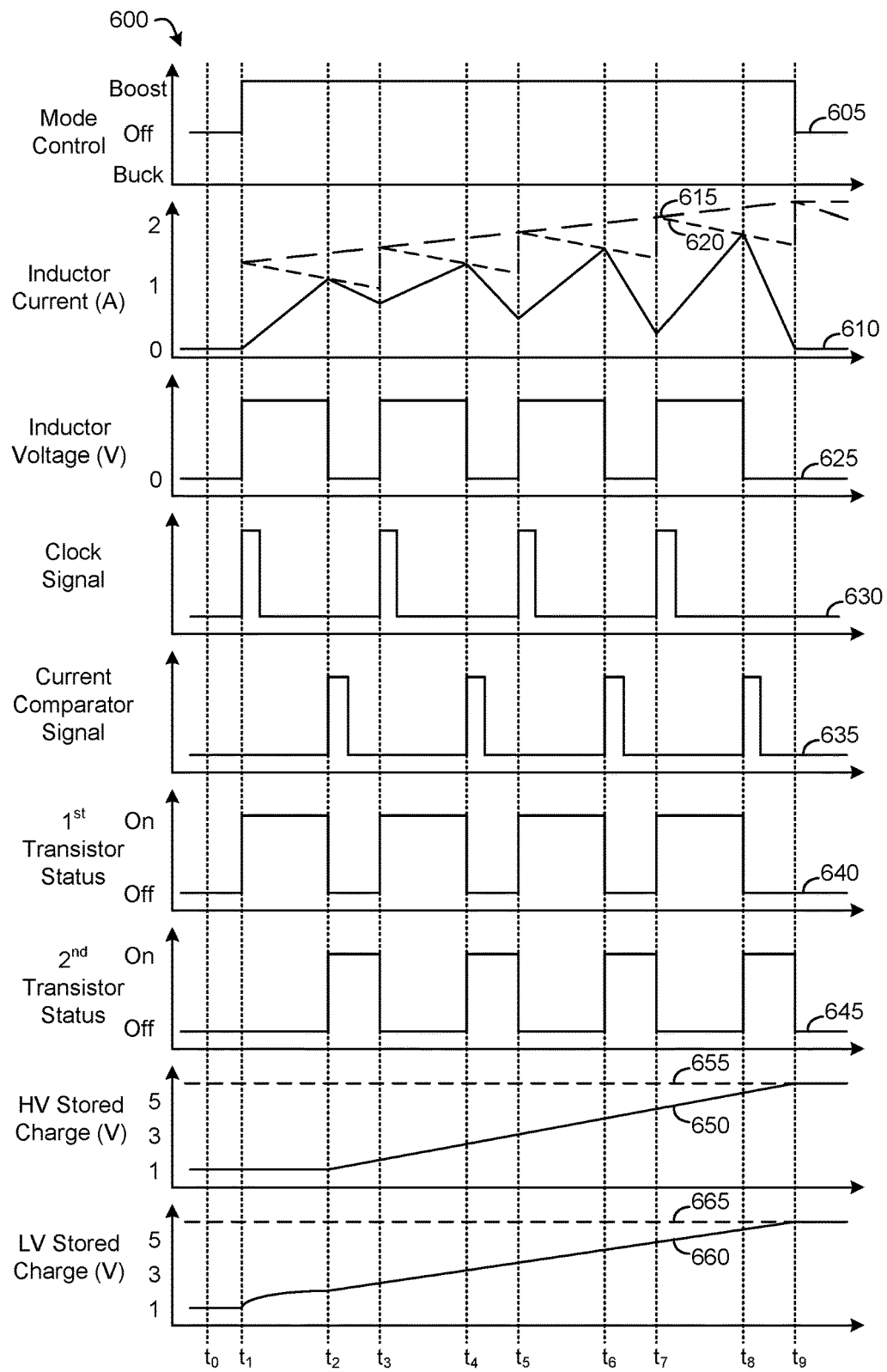
FIG. 6 shows an example timeline for charging a hybrid battery pack from an external power supply.

FIG. 6 shows an example timeline 600 for charging an asymmetric hybrid battery pack via a bi-directional charge regulator. Timeline 600 will be described with regard to rechargeable battery pack control system 500, as depicted in FIG. 5. Timeline 600 includes plot 605, indicating a mode control signal over time. Timeline 600 further includes plot 610, indicating an inductor current (e.g., inductor 420, bi-directional inductor current sensor 520) over time. The inductor current is co-plotted with plot 615, indicating a current proportionate to total battery voltage (e.g., $V_C$ 547), and plot 620, indicating a slope control signal (e.g., output of slope generator 542). Timeline 600 further includes plot 625, indicating an inductor voltage (e.g., inductor 420) over time. Timeline 600 further includes plot 630, indicating a clock signal over time (e.g., output of clock circuit 540), and plot 635, indicating a current comparator signal over time (e.g., output of comparator 545). Timeline 600 further includes plot 640, indicating the status of a first transistor over time (e.g., first transistor 425), and plot 645, indicating the status of a second transistor over time (e.g., second transistor 430). Timeline 600 further includes plot 650, indicating stored charge on the higher voltage side of the battery (e.g., higher voltage portion 210). Line 655 represents an upper threshold for stored charge on the higher voltage portion. Finally, timeline 600 includes plot 660, indicating stored charge on the lower voltage portion of the battery (e.g., lower voltage portion 205). Line 655 represents an upper threshold for stored charge on the lower voltage portion.

At time $t_0$, the mode control signal indicates that the bi-directional charge regulator is off, as shown by plot 605. Accordingly, the first and second transistors are turned off, as shown by plots 640 and 645, respectively. As such, the inductor current and inductor voltage are zero, as shown by plots 610 and 625, respectively. The clock signal (plot 630) and current comparator signal (plot 635) are null. The higher voltage portion of the battery has approximately 1V of stored charge, and the lower voltage portion of the battery also has approximately 1V of stored charge, as shown by plots 650 and 660, respectively.

At time $t_1$, the mode control signal indicates that the bi-directional charge regulator is to be operated in a Boost mode, due to the coupling of the battery pack to an external power source. Accordingly, the clock signal is triggered, and the first transistor is then turned on, while the second transistor is maintained off. In this conformation, inductor current begins to increase linearly, generating a constant inductor voltage (current entering the inductor from the lower voltage portion is arbitrarily labeled as positive current in this example). The amount of charge stored on the lower voltage portion increases, while charge is not added to the higher voltage portion of the battery initially.

The slope control signal is initiated at time $t_1$, and decreases linearly from its initial value ($V_C$, plot 615). At time $t_2$, the slope control signal becomes equal in value to the inductor current. As such, the current comparator signal is fired, turning the first transistor off, and turning the second transistor on. Current is discharged from the inductor through the second transistor towards the higher voltage portion of the battery, causing the charge stored in on the higher voltage portion to increase. The overall inductor current thus decreases, and the inductor voltage drops to zero, as no current is entering the inductor via the first transistor.

At time $t_3$, the clock signal fires, turning the first transistor on, and the second transistor off. Current flowing into the inductor increases, and inductor voltage is generated. At time $t_4$, the current comparator signal fires, flipping the transistors, and allowing current to flow out of the inductor towards the higher voltage portion of the battery.

This pattern continues from time $t_4$ through time $t_9$, with the first and second transistors alternating on and off. The first transistor is turned on from time $t_5$ to time $t_6$, and from time $t_7$ to time $t_8$. The second transistor is turned on from time $t_6$ to time $t_7$ and from time $t_8$ to time $t_9$. In this way, charge is stored on both the lower voltage portion and the higher voltage portion at the same rate, once the lower voltage portion stored charge increases above a first threshold, and increases above the higher voltage portion stored charge by a second threshold. As the total charge stored increases, more current is flowed into the inductor, but the pulse-width modulation remains relatively constant, as the stored charge increases linearly.

At time $t_9$, the higher voltage stored charge increases to the threshold indicated by line 655, and the lower voltage portion stored charge increases to the threshold indicated by line 665. Accordingly, the mode control signal indicates that the bi-directional charge regulator is to be placed in an off mode. Both the first and second transistors are turned off, and no current is provided to the inductor. The battery pack is now fully charged.

Figure 7:
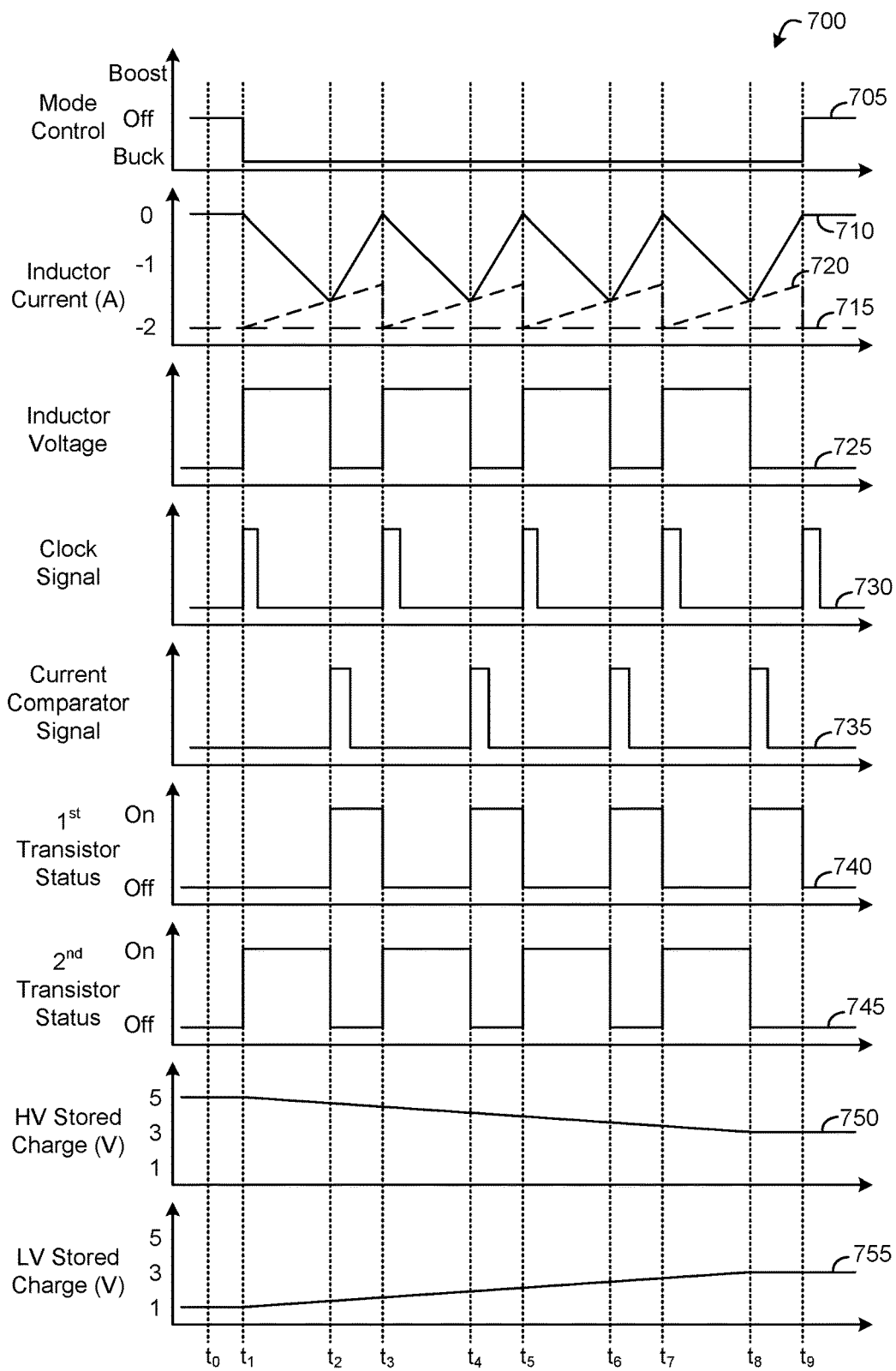
FIG. 7 shows an example timeline for balancing charge within a hybrid battery pack.

FIG. 7 shows an example timeline 700 for balancing charge within an asymmetric hybrid battery pack via a bi-directional charge regulator. Timeline 700 will be described with regard to rechargeable battery pack control system 500, as depicted in FIG. 5. Timeline 700 includes plot 705, indicating a mode control signal over time. Timeline 700 further includes plot 710, indicating an inductor current (e.g., inductor 420, bi-directional inductor current sensor 520) over time. The inductor current is co-plotted with plot 715, indicating a signal proportionate to total battery voltage (e.g., $V_C$ 547), and plot 720, indicating a slope control signal (e.g., output of slope generator 542). Timeline 700 further includes plot 725, indicating an inductor voltage (e.g., inductor 420) over time. Timeline 700 further includes plot 730, indicating a clock signal over time (e.g., output of clock circuit 540), and plot 735, indicating a current comparator signal over time (e.g., output of comparator 545). Timeline 700 further includes plot 740, indicating the status of a first transistor over time (e.g., first transistor 425), and plot 745, indicating the status of a second transistor over time (e.g., second transistor 430). Timeline 700 further includes plot 750, indicating stored charge on the higher voltage portion of the battery (e.g., higher voltage portion 210). Finally, timeline 700 includes plot 755, indicating stored charge on the lower voltage portion of the battery (e.g., lower voltage portion 205).

At time $t_0$, the mode control signal indicates that the bi-directional charge regulator is off, as shown by plot 705. Accordingly, the first and second transistors are turned off, as shown by plots 740 and 745, respectively. As such, the inductor current and inductor voltage are zero, as shown by plots 710 and 725, respectively. The clock signal (plot 730) and current comparator signal (plot 735) are null. The higher voltage portion of the battery has approximately 5V of stored charge, and the lower voltage portion of the battery also has approximately 1V of stored charge, as shown by plots 750 and 755, respectively.

At time $t_1$, the mode control signal indicates that the bi-directional charge regulator is to be operated in a Buck mode, due to the relatively low amount of stored charge at the lower voltage portion of the battery. Accordingly, the clock signal is triggered, and the second transistor is then turned on, while the first transistor is maintained off. In this conformation, inductor current begins to decrease linearly, generating a constant inductor voltage (current entering the inductor from the higher voltage portion is arbitrarily labeled as negative current in this example).

The slope control signal is initiated at time $t_1$, and increases linearly from its initial value ($V_C$, plot 715). At time $t_2$, the slope control signal becomes equal in value to the inductor current. As such, the current comparator signal is fired, turning the second transistor off, and turning the first transistor on. Current is discharged from the inductor through the first transistor towards the lower voltage portion of the battery, causing the charge stored in the lower voltage portion to increase proportionately to the decrease in stored charge on the higher voltage portion of the battery. The overall inductor current thus increases to zero and the inductor voltage drops to zero, as no current is entering the inductor via the second transistor.

At time $t_3$, the clock signal fires, turning the second transistor on, and the first transistor off. Current flowing into the inductor decreases, and inductor voltage is generated. At time $t_4$, the current comparator signal fires, flipping the transistors, and allowing current to flow out of the inductor towards the lower voltage portion of the battery.

This pattern continues from time $t_4$ through time $t_9$, with the first and second transistors alternating on and off. The second transistor is turned on from time $t_5$ to time $t_6$, and from time $t_7$ to time $t_8$. The first transistor is turned on from time $t_6$ to time $t_7$ and from time $t_8$ to time $t_9$. In this way, stored charge is moved from the higher voltage portion to the lower voltage portion. At time $t_9$, the lower voltage portion stored charge becomes equal to the higher voltage portion stored charge. Accordingly, the mode control signal indicates that the bi-directional charge regulator is to be placed in an off mode. Both the first and second transistors are turned off, and no current is provided to the inductor. The higher voltage and lower voltage portions of the battery pack are now fully balanced.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
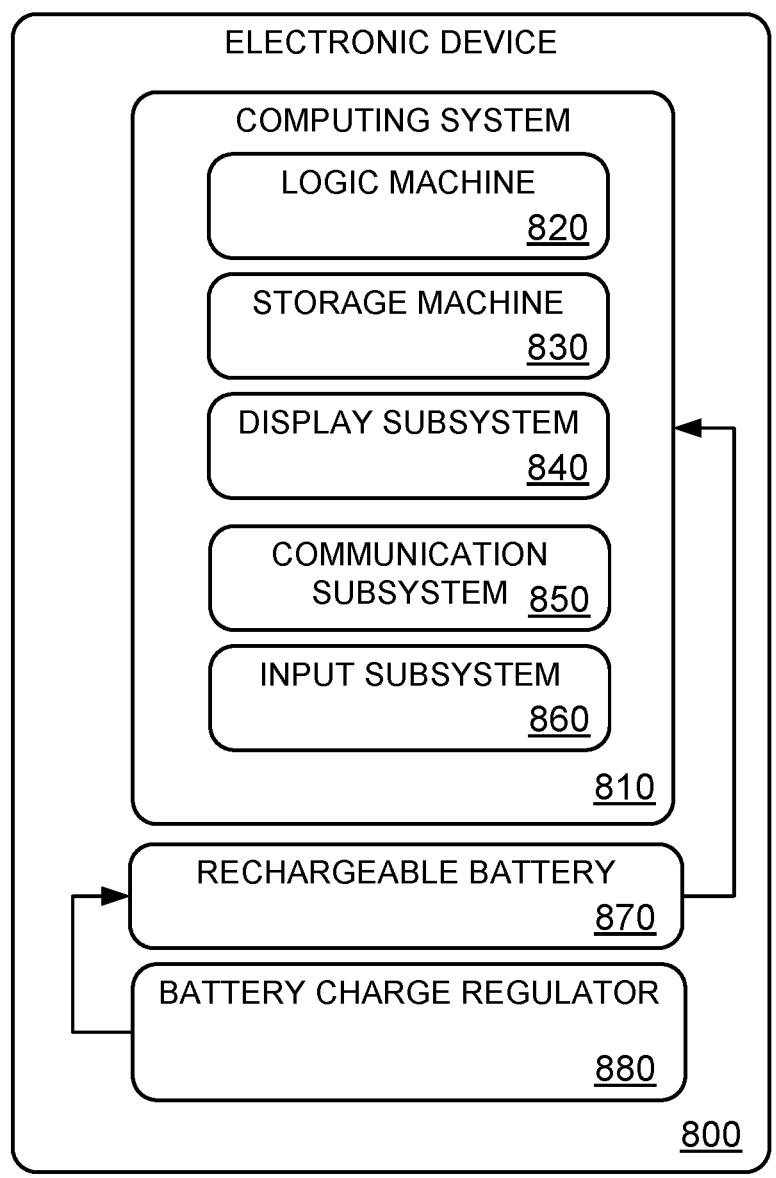
FIG. 8 schematically shows an example computing system.

FIG. 8 schematically shows a non-limiting embodiment of a battery-operated electronic device 800 that can enact one or more of the methods and processes described above. Electronic device 800 is shown in simplified form. Electronic device 800 may take the form of one or more personal computers, server computers, tablet computers, home-entertainment computers, network computing devices, gaming devices, mobile computing devices, mobile communication devices (e.g., smart phone), and/or other computing devices.

Electronic device 800 may include a computing system 810 that includes a logic machine 820 and a storage machine 830. Computing system 810 may optionally include a display subsystem 840, input subsystem 850, communication subsystem 860, and/or other components not shown in FIG. 8.

Logic machine 820 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 830 includes one or more physical devices configured to hold instructions executable by the logic machine to implement the methods and processes described herein. When such methods and processes are implemented, the state of storage machine 820 may be transformed—e.g., to hold different data.

Storage machine 830 may include removable and/or built-in devices. Storage machine 830 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 830 may include volatile, nonvolatile, dynamic, static, read/write, read-only, random-access, sequential-access, location-addressable, file-addressable, and/or content-addressable devices.

It will be appreciated that storage machine 830 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 820 and storage machine 830 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 840 may be used to present a visual representation of data held by storage machine 830. This visual representation may take the form of a graphical user interface (GUI). As the herein described methods and processes change the data held by the storage machine, and thus transform the state of the storage machine, the state of display subsystem 840 may likewise be transformed to visually represent changes in the underlying data. Display subsystem 840 may include one or more display devices utilizing virtually any type of technology. Such display devices may be combined with logic machine 820 and/or storage machine 830 in a shared enclosure, or such display devices may be peripheral display devices.

When included, input subsystem 850 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 860 may be configured to communicatively couple computing system 810 with one or more other computing devices. Communication subsystem 860 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 810 to send and/or receive messages to and/or from other devices via a network such as the Internet.

Electronic device 800 may include one or more rechargeable batteries 870. Rechargeable battery 870 may provide power to compute system 810, logic machine 820, storage machine 830, display subsystem 840, communication subsystem 850, input subsystem 860, and/or to other power consuming elements of electronic device 800. A battery charge regulator 880 may regulate charge distribution within rechargeable battery 870. Battery charge regulator 880 may function to distribute charge between two or more charge storage cells within rechargeable battery 870, and may facilitate charge distribution within rechargeable battery 870 when electronic device 800 is coupled to an external power supply and/or when electronic device 800 is not coupled to an external power supply.

In another example, a system for a rechargeable battery pack, comprises one or more lower voltage cells connectable to a charging circuit via a lower voltage terminal; one or more higher voltage cells electrically coupled in series to the one or more lower voltage cells via a bi-directional charge regulator; a higher voltage terminal electrically coupled to the one or more higher voltage cells; and a common ground terminal coupled to the one or more lower voltage cells and to the one or more higher voltage cells. In such an example, or any other example, the one or more lower voltage cells may additionally or alternatively comprise a plurality of lower voltage cells coupled in parallel. In any of the preceding examples, or any other example, a quantity of lower voltage cells may additionally or alternatively be greater than or equal to a quantity of higher voltage cells. In any of the preceding examples, or any other example, the system may additionally or alternatively comprise a transistor selectively operable to electrically couple a negative terminal of the one or more lower voltage cells to the common ground terminal. In any of the preceding examples, or any other example, the bi-directional charge regulator may additionally or alternatively be configured to provide current to the one or more higher voltage cells responsive to the one or more lower voltage cells being connected to the charging circuit. In any of the preceding examples, or any other example, the bi-directional charge regulator may additionally or alternatively be configured to: responsive to the one or more lower voltage cells being connected to the charging circuit, monitor voltages of the one or more lower voltage cells and one or more higher voltage cells; and regulate charge flow to the one or more higher voltage cells such that a state of charge increase at the one or more higher voltage cells is within a controller error margin of a state of charge increase at the one or more lower voltage cells. In any of the preceding examples, or any other example, the bi-directional charge regulator may additionally or alternatively be configured to provide current to the one or more lower voltage cells from the one or more higher voltage cells responsive to a state of charge of the one or more lower voltage cells decreasing below a state of charge of the one or more higher voltage cells by a threshold. In any of the preceding examples, or any other example, the bi-directional charge regulator may additionally or alternatively be configured to cease providing current to the one or more lower voltage cells from the one or more higher voltage cells responsive to a state of charge of the one or more lower voltage cells increasing to within a threshold of the state of charge of the one or more higher voltage cells. In any of the preceding examples, or any other example, the bi-directional charge regulator may additionally or alternatively be powered from the one or more higher voltage cells.

In another example, a system for an asymmetric rechargeable battery pack, comprises: a first set of battery cells electrically coupled in parallel and connectable to a charging circuit; a second set of battery cells electrically coupled in series to the first set of battery cells; first and second output terminals; a common ground terminal electrically coupled to both the first set of battery cells and to the second set of battery cells; and a bi-directional charge regulator electrically coupled between the first set of battery cells and the second set of cells, the bi-directional charge regulator being configured to: provide current to the second set of cells responsive to the first set of cells being connected to the charging circuit; and provide current to the first set of cells responsive to a state of charge of the first set of cells decreasing below a state of charge of the second set of cells by a threshold. In such an example, or any other example, the bi-directional charge regulator may additionally or alternatively comprise an inductor; a first transistor selectively operable to couple the inductor to the first set of cells; and a second transistor selectively operable to couple the inductor to the second set of cells. In any of the preceding examples, or any other example, the bi-directional charge regulator may additionally or alternatively be configured to provide current to the second set of cells responsive to the first set of cells being connected to the charging circuit by generating charge buildup at the inductor by turning on the first transistor and not the second transistor; and providing current to the second set of cells from the inductor by turning on the second transistor and turning off the first transistor. In any of the preceding examples, or any other example, the bi-directional charge regulator may additionally or alternatively be configured to provide current to the first set of cells responsive to a state of charge of the first set of cells decreasing below a state of charge of the second set of cells by a threshold by generating charge buildup at the inductor by turning on the second transistor and not the first transistor; and providing current to the first set of cells from the inductor by turning on the first transistor and turning off the second transistor.

In yet another example, a rechargeable battery pack comprises a lower voltage portion including one or more lower voltage cells connectable to a charging circuit via a lower voltage output; a higher voltage portion including one or more higher voltage cells coupled to a higher voltage output, the higher voltage cells electrically coupled in series to the one or more lower voltage cells; a bi-directional charge regulator coupled between the lower voltage portion and the higher voltage portion, the bi-directional charge regulator comprising: an inductor; a first transistor selectively operable to couple the inductor to the lower voltage portion; a second transistor selectively operable to couple the inductor to the higher voltage portion; and a control circuit configured to selectively actuate the first and second transistor based on at least a mode control signal indicating whether the bi-directional charge regulator is to operate in a charging or discharging mode. In such an example, or any other example, the control circuit may additionally or alternatively be further configured to: actuate one of the first transistor and second transistor responsive to receiving a periodic clock signal; and switch which of the first transistor and the second transistor is actuated responsive to an inductor current reaching a threshold. In any of the preceding examples, or any other example, the control circuit may additionally or alternatively be further configured to initiate actuation of the first and second transistors responsive to receiving signals indicating an amount of charge stored on the lower voltage portion is below a threshold; and a charge storage differential between the lower voltage portion and the higher voltage portion is above a threshold. In any of the preceding examples, or any other example, the control circuit may additionally or alternatively be further configured to turn both the first and second transistors off responsive to receiving signals indicating a state of charge on the lower voltage portion is within a threshold of the state of charge on the higher voltage portion. In any of the preceding examples, or any other example, the control circuit may additionally or alternatively be further configured to initiate actuation of the first and second transistors responsive to receiving signals indicating the lower voltage portion is coupled to a charging circuit; a state of charge on the lower voltage portion is above a threshold; and a state of charge differential between the lower voltage portion and the higher voltage portion is above a threshold. In any of the preceding examples, or any other example, the control circuit may additionally or alternatively be further configured to turn both the first and second transistors off responsive to receiving signals indicating the state of charge on the lower voltage portion is above a threshold; and the state of charge on the higher voltage portion is above a threshold. In any of the preceding examples, or any other example, the mode control signal may additionally or alternatively actuate one or more current amplifiers and one or more voltage amplifiers within the control circuit.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A system for a rechargeable battery pack, comprising:
one or more lower voltage cells connectable to a charging circuit via a lower voltage terminal;
one or more higher voltage cells electrically coupled in series to the one or more lower voltage cells via a bi-directional charge regulator;
a higher voltage terminal electrically coupled to the one or more higher voltage cells; and a common ground terminal coupled to the one or more lower voltage cells and to the one or more higher voltage cells.

2. The system of claim 1, wherein the one or more lower voltage cells comprise a plurality of lower voltage cells coupled in parallel.

3. The system of claim 1, wherein a quantity of lower voltage cells is greater than or equal to a quantity of higher voltage cells.

4. The system of claim 1, further comprising a transistor selectively operable to electrically couple a negative terminal of the one or more lower voltage cells to the common ground terminal.

5. The system of claim 1, wherein the bi-directional charge regulator is configured to provide current to the one or more higher voltage cells responsive to the one or more lower voltage cells being connected to the charging circuit.

6. The system of claim 5, wherein the bi-directional charge regulator is further configured to:
responsive to the one or more lower voltage cells being connected to the charging circuit, monitor voltages of the one or more lower voltage cells and one or more higher voltage cells; and
regulate charge flow to the one or more higher voltage cells such that a state of charge increase at the one or more higher voltage cells is within a controller error margin of a state of charge increase at the one or more lower voltage cells.

7. The system of claim 1, wherein the bi-directional charge regulator is configured to provide current to the one or more lower voltage cells from the one or more higher voltage cells responsive to a state of charge of the one or more lower voltage cells decreasing below a state of charge of the one or more higher voltage cells by a threshold.

8. The system of claim 7, wherein the bi-directional charge regulator is further configured to cease providing current to the one or more lower voltage cells from the one or more higher voltage cells responsive to a state of charge of the one or more lower voltage cells increasing to within a threshold of the state of charge of the one or more higher voltage cells.

9. The system of claim 1, wherein the bi-directional charge regulator is powered from the one or more higher voltage cells.

10. A system for an asymmetric rechargeable battery pack, comprising:
a first set of battery cells electrically coupled in parallel and connectable to a charging circuit;
a second set of battery cells electrically coupled in series to the first set of battery cells;
first and second output terminals;
a common ground terminal electrically coupled to both the first set of battery cells and to the second set of battery cells; and
a bi-directional charge regulator electrically coupled between the first set of battery cells and the second set of cells, the bi-directional charge regulator being configured to:
provide current to the second set of cells responsive to the first set of cells being connected to the charging circuit; and
provide current to the first set of cells responsive to a state of charge of the first set of cells decreasing below a state of charge of the second set of cells by a threshold.

11. The system of claim 10, wherein the bi-directional charge regulator comprises:

an inductor;
a first transistor selectively operable to couple the inductor to the first set of cells; and
a second transistor selectively operable to couple the inductor to the second set of cells.

12. The system of claim 11, wherein the bi-directional charge regulator is configured to provide current to the second set of cells responsive to the first set of cells being connected to the charging circuit by
generating charge buildup at the inductor by turning on the first transistor and not the second transistor; and
providing current to the second set of cells from the inductor by turning on the second transistor and turning off the first transistor.

13. The system of claim 11, wherein the bi-directional charge regulator is configured to provide current to the first set of cells responsive to a state of charge of the first set of cells decreasing below a state of charge of the second set of cells by a threshold by
generating charge buildup at the inductor by turning on the second transistor and not the first transistor; and
providing current to the first set of cells from the inductor by turning on the first transistor and turning off the second transistor.

14. A rechargeable battery pack comprising:
a lower voltage portion including one or more lower voltage cells connectable to a charging circuit via a lower voltage output;
a higher voltage portion including one or more higher voltage cells coupled to a higher voltage output, the higher voltage cells electrically coupled in series to the one or more lower voltage cells;
a bi-directional charge regulator coupled between the lower voltage portion and the higher voltage portion, the bi-directional charge regulator comprising:
an inductor;
a first transistor selectively operable to couple the inductor to the lower voltage portion;
a second transistor selectively operable to couple the inductor to the higher voltage portion; and
a control circuit configured to selectively actuate the first and second transistor based on at least a mode control signal indicating whether the bi-directional charge regulator is to operate in a charging or discharging mode.

15. The rechargeable battery pack of claim 14, where the control circuit is further configured to:
actuate one of the first transistor and second transistor responsive to receiving a periodic clock signal; and
switch which of the first transistor and the second transistor is actuated responsive to an inductor current reaching a threshold.

16. The rechargeable battery pack of claim 15, where the control circuit is further configured to initiate actuation of the first and second transistors responsive to receiving signals indicating
an amount of charge stored on the lower voltage portion is below a threshold; and
a charge storage differential between the lower voltage portion and the higher voltage portion is above a threshold.

17. The rechargeable battery pack of claim 16, wherein the control circuit is further configured to turn both the first and second transistors off responsive to receiving signals indicating a state of charge on the lower voltage portion is within a threshold of the state of charge on the higher voltage portion.

18. The rechargeable battery pack of claim 15, where the control circuit is further configured to initiate actuation of the first and second transistors responsive to receiving signals indicating the lower voltage portion is coupled to a charging circuit;

a state of charge on the lower voltage portion is above a threshold; and a state of charge differential between the lower voltage portion and the higher voltage portion is above a threshold.

19. The rechargeable battery pack of claim 18, wherein the control circuit is further configured to turn both the first and second transistors off responsive to receiving signals indicating the state of charge on the lower voltage portion is above a threshold; and the state of charge on the higher voltage portion is above a threshold.

20. The rechargeable battery pack of claim 14, wherein the mode control signal actuates one or more current amplifiers and one or more voltage amplifiers within the control circuit.

* * * * *